Figure 1:
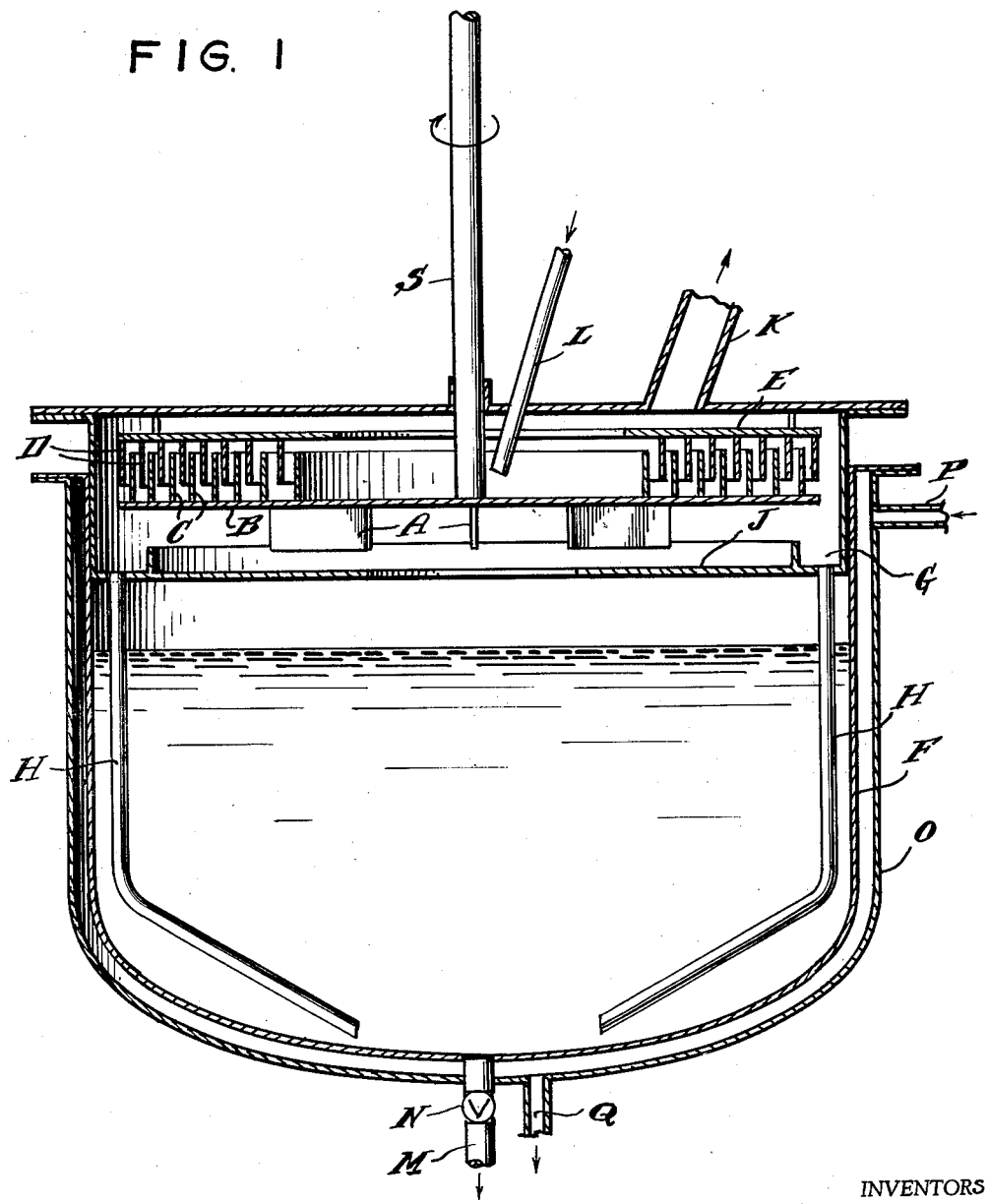

Oct. 22, 1963   R. H. BOWERS ETAL   3,108,049
CENTRIFUGAL APPARATUS

Filed Aug. 10, 1959   3 Sheets-Sheet 1

INVENTORS
ROY HOLT BOWERS
TADUSZ WISNIEWSKI

BY
Cushman, Darby & Cushman
ATTORNEYS

Oct. 22, 1963  R. H. BOWERS ETAL  3,108,049
CENTRIFUGAL APPARATUS

Filed Aug. 10, 1959  3 Sheets-Sheet 3

INVENTORS
ROY HOLT BOWERS
TADUSZ WISNIEWSKI

BY
Cushman, Darby & Cushman
ATTORNEYS

United States Patent Office 3,108,049
Patented Oct. 22, 1963

3,108,049
CENTRIFUGAL APPARATUS
Roy Holt Bowers, Manchester, England, and Tadeusz Wisniewski, Baltimore, Md., assignors to Imperial Chemical Industries Limited, London, England, a corporation of Great Britain
Filed Aug. 10, 1959, Ser. No. 840,216
Claims priority, application Great Britain Aug. 22, 1958
4 Claims. (Cl. 202—197)

This invention relates to improvements in or relating to centrifugal apparatus and more particularly to improvements in the centrifugal apparatus described in British Patent No. 598,531.

In British Patent No. 598,531 there is described and claimed in apparatus for heating a liquid or treating a liquid with a gas or vapour or treating a gas or vapour with a liquid wherein the liquid passes through an interspace afforded by fixed and rotary plates carrying rings or having corrugations arranged so that the ring or corrugations on the fixed plate alternate with those on the rotary plate whereby under centrifugal action the liquid is dispersed in film form on the ring surfaces and flows in a serpentine or a zig-zag course through the space.

This centrifugal apparatus is suitable for certain purposes, for example the fractionation by distillation of a liquid mixture into two or more components when the high volumetric efficiency and comparative compactness of the apparatus is an advantage. Under such conditions the liquid mixture is boiled in a separate boiling vessel. This centrifugal apparatus, although more compact than conventional fractional distillation apparatus, still has a fairly large exposed surface which is a disadvantage for distillation at high temperatures. It is known, however, that this disadvantage may be obviated or minimised by mounting the said centrifugal apparatus inside the boiling vessel, which boiling vessel may be of any convenient shape or size of the kind in common industrial use; for example a jacketed pan of diameter somewhat larger than the rotor diameter. The centrifugal apparatus is conveniently and preferably mounted at the top of the boiling vessel such that the rotary plate is parallel to the surface of the contents of the boiling vessel. The advantages of placing the centrifugal apparatus inside the boiling vessel, as distinct from having the centrifugal apparatus in a separate unit and connected to a boiling vessel by pipelines are that there are greatly reduced heat losses due to the smaller exposed surface and savings in capital cost due to the smaller size of the apparatus and the simpler supporting structure.

Thus, the centrifugal apparatus, which is described in British Patent 598,531 as adapted for providing intimate contact between vapors and liquid can be used to permit intimate contact between vapors coming up from a reboiler and refluxing liquid or liquid input in a fractional distillation. It is also suitable for separation of different constituents or of dissolved materials from a mass of liquid consistency. The arrangement will create continuous variations in the direction of the centrifuged bodies, thereby curdling or separating the layer of liquid under treatment and causing varying or zig-zag displacements of the same which have shown, in the experiments performed, an increase in the separation effect even at low speeds, such result being enhanced, to a considerable degree, by the facility with which the temperature may be adjusted in each particular case.

An example of separation is the separation of alcohol from fermented must. The fermented must is introduced into the inner part of the apparatus and through centrifugal action flows to the outer edge between the fixed and rotary plates. Steam is contacted with the fermented must as it flows along the serpentine or zig-zag course described above and it carries off the alcohol as a vapor.

According to the present invention we provide for use in distillation processes an improved form of the apparatus described in British Patent No. 598,531 such apparatus being placed inside the boiling vessel and modified by the addition of vanes to the lower rotary plate on the face opposite to that carrying rings or corrugations, an annular baffle being fitted in the vessel just below the vanes.

The improvement obtained is a greatly reduced pressure difference between the boiler and the condenser. This pressure difference may, under certain conditions, be negative, thus allowing the pressure in the boiler to be lower than that in the condenser. This improvement is of great value in the vacuum distillation of thermally unstable materials.

Preferably the vanes are attached radially to the lower rotary plate as thereby the centrifugal action is most simply obtained.

Although in British Patent No. 598,531 one of the plates is said to be fixed, in fact it is known that both plates may be made to rotate and this feature is included in our invention.

It has also been found, and this discovery is a preferred embodiment of the invention, that by separating the rings or corrugations carried by the fixed or rotary plates from each other by a gradually increasing distance in the direction from the periphery to the centre of the plates such that the area of plate enclosed between any two consecutive rings or corrugations is substantially constant and the same, a further improvement in the centrifugal distillation apparatus is obtained, namely a greatly reduced pressure drop per ring or corrugation through the apparatus under conditions of high throughput, and therefore a reduced maximum temperature in the apparatus. This improvement is of further value in the vacuum distillation of thermally unstable materials.

Figure 2:
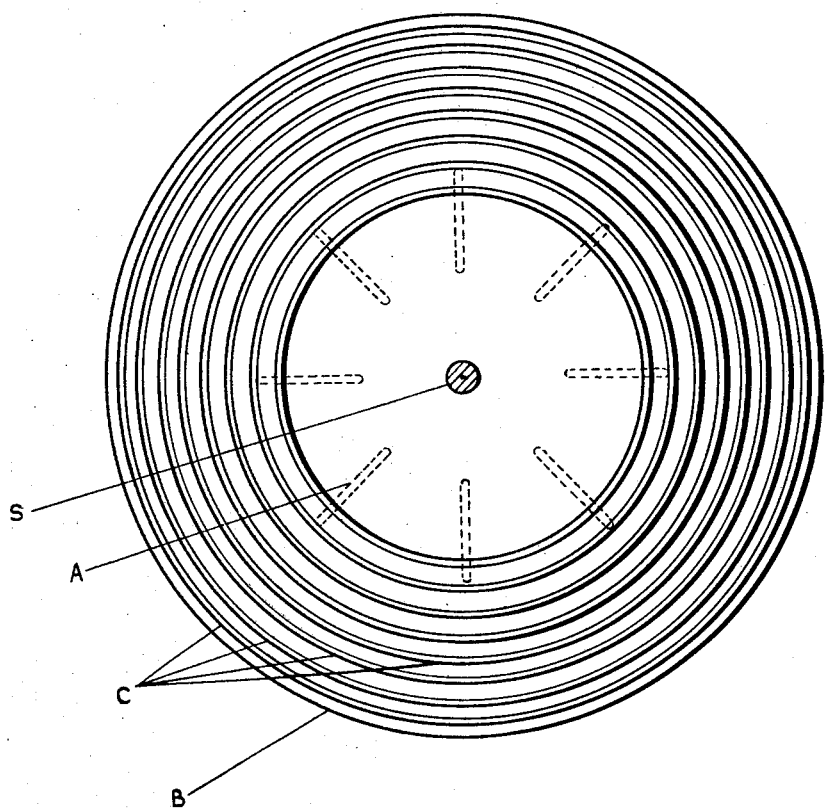
Figure 3:
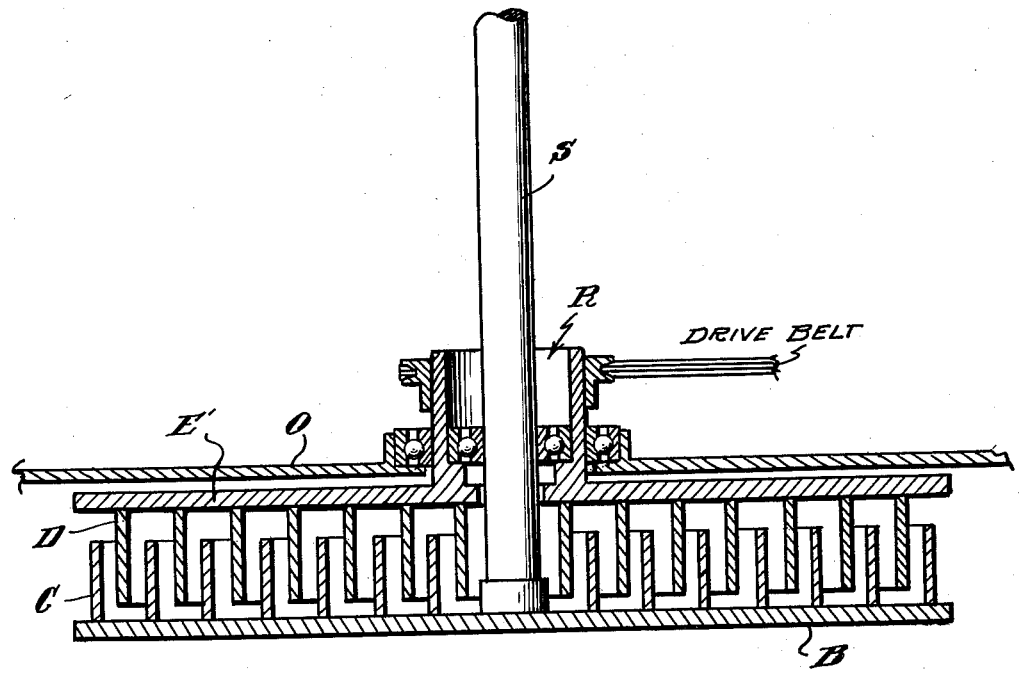

In order that the principal parts constituting a particular form of the apparatus according to the invention may be more fully understood, reference is made to the drawings wherein FIGURE 1 is a vertical cross-section of the centrifugal apparatus, FIGURE 2 is a plan of the rotating plate, and FIGURE 3 is a detail cross-sectional view showing constructional features of a modification of this invention.

In the drawings, the rotary plate B carries radial vanes A on the under-surface and rings or corrugations C on the upper surface, and is attached to a shaft S which is rotated by a motor. The rings or corrugations C alternate with rings or corrugations D carried by a fixed disc E, this disc being secured under the lid of a boiling vessel F. The boiling vessel F has a channel shaped well G and baffle ring J attached thereto of which the well G collects condensate and returns it to the mass of liquid in the container vessel by means of tubes or pipelines H, an outlet K for vapour to pass to a condenser, an inlet for condensate or charge liquors L, and an outlet M for discharging spent liquors having a control valve N. Also, the vessel F is surrounded by a jacket O, fitted with an inlet P and an outlet Q.

Referring to FIGURE 3, rings or corrugations C on lower rotary plate B alternate with rings or corrugations D carried by upper rotary disc E'. Plate B rotates by means of attachment to shaft S supported by the center section of the bearing indicated generally at R, while upper disc E' rotates due to connection with the drive belt attached thereto through the outer portion of bearing R as shown. O' denotes the upper portion of the jacket shown in FIGURE 1.

The manner in which the centrifugal apparatus according to the invention is used may be described with reference to a typical batch distillation process for the separation of N-heptane and toluene (a continuous distillation process is of course equally possible). The plate B is first set in rotation and the charge liquor comprising a mixture of N-heptane and toluene is introduced into the boiling vessel F via the inlet pipeline L. Steam is then admitted to the jacket O via the inlet pipeline P and the aqueous condensate is removed through the outlet pipe Q. The charge liquors are then heated to their boiling point and the vapours arising pass between the rings or corrugations on the rotary plate B and the fixed disc E. The vapours pass from the apparatus through the outlet pipeline K to a condenser, are condensed to a liquid and the liquid flows back to the distillation apparatus via the inlet pipeline L. The liquid then passes between the rotary plate B and the fixed disc E and the liquid is brought into intimate contact with the vapours passing in the opposite direction at each ring or corrugation and rectification takes place. The liquid discharged from the periphery of the rotary plate returns to the mass of liquid in the boiling vessel F via the pipelines H.

When equilibrium has been reached, that is when there is no further rise in the proportion of N-heptane in the liquors returning to the top of the apparatus via the pipeline L, and the flows of liquid and vapour are steady, a suitable proportion of the flow of condensed liquor, rich in N-heptane is diverted to a receiving vessel from a convenient branch in the pipeline L (not shown in the diagram). At a suitable point in the distillation process heating is discontinued by shutting off the steam and allowing the apparatus to cool. The spent liquor rich in toluene may then be discharged from the bottom of the vessel through the outlet pipeline M and the rotary plate B is stopped.

What we claim is:

1. In a distillation apparatus comprising a vessel for evaporating the liquid to be distilled, centrifugal liquid-gas contacting means comprising a pair of plates, means mounting said plates horizontally in vertically-spaced relationship in the upper portion of said vessel and separated from the walls of the vessel to define a passageway therebetween, radially spaced, generally circular members alternately extending from the opposing surfaces of said plates, means for rotating the lower of said plates, outlet means for leading vapors from an inner portion of said centrifugal liquid-gas contacting means to a condenser and inlet means for returning reflux condensate and introducing feedstock into an inner portion of the centrifugal liquid-gas contacting means and between the plates thereof; the improvement which comprises vanes depending downwardly from the lower surface of said lower plate, an annular baffle and means mounting said baffle in the upper part of the vessel with its outer edge affixed to the wall of said vessel in a generally horizontal position and below and generally parallel to the lower of said plates, whereby said baffle lies between the lower of said plates and the liquid in the vessel, thereby forming a channel between itself and the lower plate leading to said passageway between the centrifugal means and the walls of the vessel, a tube depending from the outer portion of said baffle and extending to the lower portion of said vessel to permit liquid falling onto the baffle from said centrifugal liquid-gas contacting means to flow into the liquid in the vessel below the level of the liquid, and an annular wall extending upwardly from said baffle inwardly of said tube to define between itself and the wall of the vessel a well in which liquid accumulates for transfer to the vessel through said tube.

2. A distillation apparatus as set forth in claim 1 including means to rotate the upper of said flat plates.

3. A distillation apparatus as set forth in claim 1 in which the distance between said circular members is greater at the center of said plates than at the outer edges thereof, the area of plate enclosed between any two adjacent circular members being substantially the same.

4. A distillation apparatus as set forth in claim 1 in which the vanes extend radially of said lower plate.

References Cited in the file of this patent

UNITED STATES PATENTS

| | | |
|---|---|---|
| 1,862,069 | Subkow | June 7, 1932 |
| 1,943,106 | Burnham | Jan. 9, 1934 |
| 2,018,778 | Ebner | Oct. 29, 1935 |
| 2,224,025 | Sondermann | Dec. 3, 1940 |
| 2,370,464 | Hickman | Feb. 27, 1945 |
| 2,525,025 | Feil | Oct. 10, 1950 |
| 2,551,815 | Schulz | May 8, 1951 |
| 2,722,505 | Faulkner | Nov. 1, 1955 |
| 2,847,200 | Ung | Aug. 12, 1958 |
| 2,973,189 | Cho | Feb. 28, 1961 |

FOREIGN PATENTS

| | | |
|---|---|---|
| 598,531 | Great Britain | Feb. 26, 1948 |